[redacted]

[11] 3,577,023

[72] Inventor Lewis W. Bleiman
Northridge, Calif.
[21] Appl. No. 882,108
[22] Filed Dec. 4, 1969
[45] Patented May 4, 1971
[73] Assignee Advanced Peripherals, Inc.
Van Nuys, Calif.

[54] MOVING COIL ACTUATOR
15 Claims, 4 Drawing Figs.

[52] U.S. Cl. .......... 310/13, 310/27
[51] Int. Cl. .......... H02k 41/02
[50] Field of Search .......... 340/174.1 (Inquired); 179/115; 310/12, 13, 14, 15; 318/135

[56] References Cited

UNITED STATES PATENTS

| | | | |
|---|---|---|---|
| 3,130,331 | 4/1964 | Jallen et al. | 310/14 |
| 3,407,749 | 10/1968 | Frig | 310/13X |
| 3,470,399 | 9/1968 | Johnson et al. | 310/13 |
| 3,487,241 | 12/1969 | Carter | 310/13 |

OTHER REFERENCES

Rexford, " High Force Constant Voice Coil Motor for Rapid Seek," IBM Technical Disclosure Bulletin, Vol. 12, No. 12, May 1970

*Primary Examiner*—D. F. Duggan
*Attorney*—Fulwider, Patton, Rieber, Lee & Utecht

ABSTRACT: A moving-coil actuator having a carriage with an upright supporting post and an elongated undercarriage extending in one direction along a track for supporting the carriage. An electrical coil mounted on one side of the post projects in the same direction as the undercarriage into an annular air gap in a permanent magnet assembly, the undercarriage projecting into the assembly through a slot therein, and a plurality of head-supporting arms project in the opposite direction from the post into a stack of memory discs. Roller bearings adjacent the opposite ends of the undercarriage ride on inclined ways on the track, and a holddown bearing assembly is spring urged upwardly to ride along overlying ways. One element of an optical position-determining device is rigidly mounted on the undercarriage to coact with fixed elements on the actuator to determine the position of the carriage.

INVENTOR.
LEWIS W. BLEIMAN
BY Fulwider, Patton, Rieber
Lee, and Utecht
ATTORNEYS INVENTOR.
LEWIS W. BLEIMAN
BY Zulwider, Patton, Rieber
Lee, and Utecht
ATTORNEYS

MOVING COIL ACTUATOR

BACKGROUND OF THE INVENTION

The present invention relates generally to reciprocating actuators for shifting a load rapidly back and forth between different precisely located positions, and more particularly to an actuator for positioning magnetic heads relative to discs in a disc memory system to read stored information from selected magnetic tracks on the discs.

In a magnetic disc memory system, a plurality of memory discs are arranged in spaced, parallel relation in a vertical stack, each disc having concentric magnetic tracks of recorded information on both its sides, and a disc-reading assembly is supported beside the stack with a plurality of arms extending horizontally into the stack between the discs thereof and carrying magnetic heads for engagement with the tracks of the disc. Typically, one arm extends into the stack between each pair of discs and supports two heads, one for engaging the underside of the upper disc and another for engaging the top of the lower disc. The arms are supported on a carriage that is mounted on a track for movement toward and away from the stack, thereby to align each head with any selected magnetic track on the associated disc for engagement of the head with the track and reading of the information recorded on the track.

While various types of actuators have been provided to shift the disc-reading assembly back and forth along its track between different selected, and precisely located, positions, the present invention is particularly adapted for use in a so-called "moving coil" actuator in which an electrical coil is mounted on one side of the carriage and projects into an annular air gap formed in a permanent magnet assembly which produces a magnetic field in the gap. When the coil is energized, the current in the coil reacts with the magnetic field to produce a motive force on the coil, and thus on the carriage, to shift the latter in one direction or the other along its track, the magnitude and direction of the force depending upon the characteristics of the energizing current. A position-determining device senses the location of the assembly and cooperates with an external control in varying the energization of the coil to control the position of the assembly.

In conventional moving-coil actuators, the base of support of the carriage is limited to the space between the stack and the magnet assembly and the coil is supported only at one end of the carriage to project, cantilever fashion, into the gap. When the motive forces are developed in the coil, there is a tendency to tilt the carriage relative to its supporting track, with a resulting tendency to cause binding of the bearings that support the carriage on the track. This, plus a tendency of the motive forces to deform the coil and its relatively light, supporting coil form, can cause a change in attitude of the carriage and deflection of the heads relative to the discs, with resulting errors in the location of the heads relative to the magnetic tracks.

SUMMARY OF THE INVENTION

The present invention resides in an actuator of the foregoing character in which the carriage and the coil are more securely supported to resist changes in attitude of the carriage and deformation of the coil in use, thereby to provide a more accurate and smoother operating actuator that is less susceptible to becoming misaligned in service use. The carriage of the actuator is formed and mounted in a novel manner to provide a broader base of support so that the center of gravity of the assembly is positioned to minimize the effects of twisting moments of force, and the improved carriage supports the coil adjacent both of its ends to reduce deformation of the coil by the forces that are developed in the coil when the latter is energized.

In the presently preferred embodiment shown herein for purposes of illustration, the carriage is an L-shaped member comprising an upright post with the head-supporting arms secured to and projecting forwardly from one of its sides and with the coil secured to and projecting rearwardly from its opposite side, and a horizontal portion secured to the lower end of the post and extending along the underside of the coil above the track along which the carriage moves. This portion forms an undercarriage which extends into a slot in the underside of the magnet assembly and is secured to the rear end of the coil within the assembly.

Two sets of roller bearings are spaced apart along the undercarriage on opposite sides of the center of the center of gravity of the assembly to ride on the track, and an additional set of roller bearings is centrally located on the undercarriage and spring-urged upwardly against overlying ways to hold the main bearings firmly against the main track.

In addition, the main bearings ride on oppositely inclined ways on the main track to resist lateral displacement of the assembly, and a guide bar fast on the upper end of the post projects forwardly and rides between a pair of guide bearings to complete the support and guiding of the assembly. With this arrangement, one element of the position-determining device may be rigidly mounted on the undercarriage to provide a direct and accurate position signal for use in controlling movements of the assembly.

Other features, objects and advantages of the invention will be apparent from the following detailed description, taken in conjunction with the accompanying drawings.

DETAILED DESCRIPTION

Figure 1:
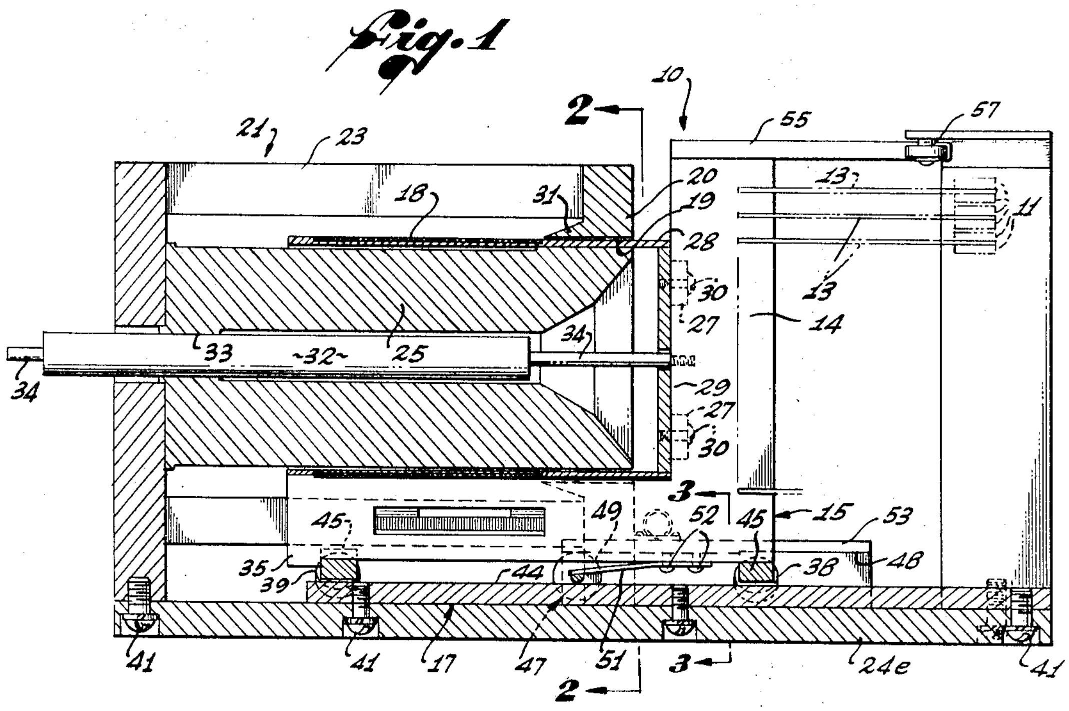
FIG. 1 is a longitudinal cross-sectional view of an actuator embodying the novel features of the present invention, with representative magnetic heads shown in broken lines.

As shown in the drawings for purposes of illustration, the invention is embodied in an actuator of the moving-coil type including a disc-reading assembly 10 having a plurality of heads 11 and 12 supported on arms 13 projecting horizontally to the right (FIG. 1) from an upright support 14 on a carriage 15 that is movable back and forth along a horizontal track 17 by the forces developed in an electrical coil 18 projecting to the left from the support 14 into an annular air gap 19 formed in the front plate 20 of a permanent magnet assembly 21. Two heads 11 and 12 are mounted in the manner shown in FIG. 4 on the forked-free end of each arm 13, one above and one below the arm, for engagement in a conventional manner with spaced discs (not shown) in a disc memory system to read recorded information from selected magnetic tracks on the associated disc.

Figure 2:
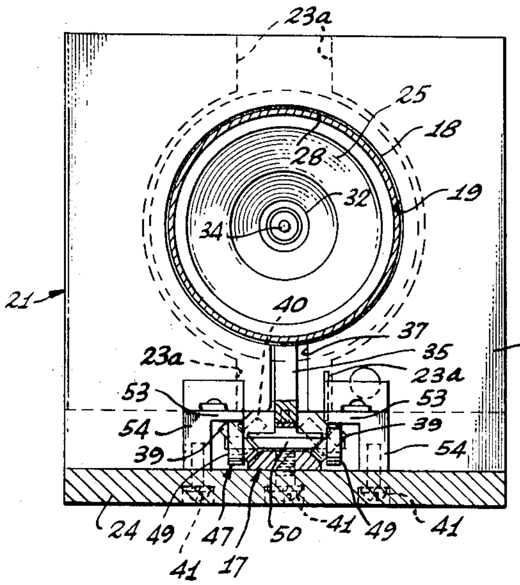
FIG. 2 is a cross-sectional view taken substantially along the line 2–2 of FIG. 1.
Figure 4:
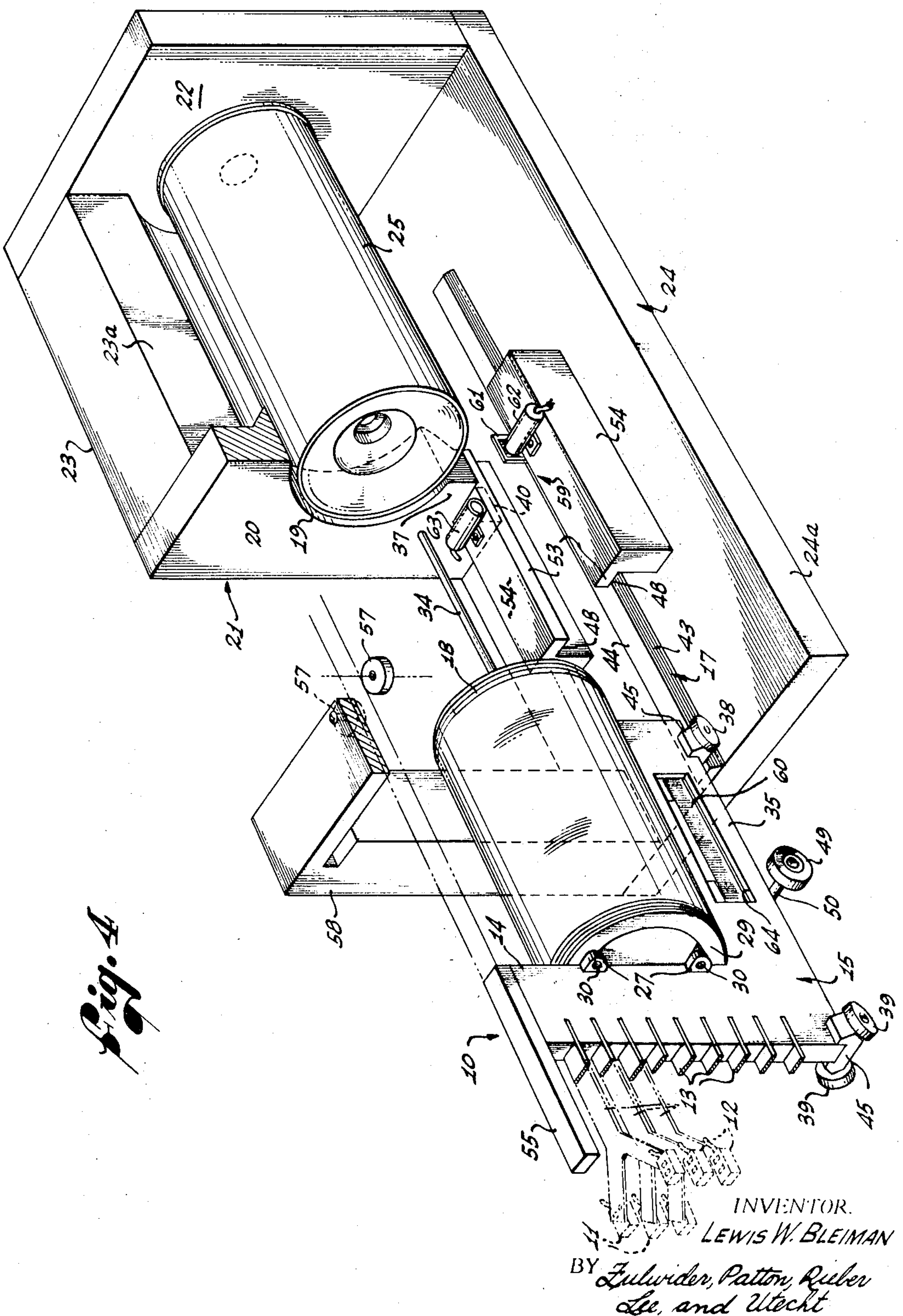
FIG. 4 is an exploded, partially broken-away perspective view of the actuator showing the disc-reading assembly separated from the magnet assembly.

As shown most clearly in FIGS. 1, 2 and 4, the permanent magnet assembly 21 is a boxlike structure including the front plate 20 which is rectangular and is formed with a central circular hole, a similar rectangular plate 22 constituting the rear wall of the assembly, and upright sides 23 of generally U-shaped cross section that are composed of permanent magnet material and are spaced apart to form the opposite sides of a generally cylindrical recess in the center of the assembly. The front, rear and sides of the magnet assembly are supported on a horizontal base 24 which extends beyond the front plate 20 to from a platform **24*a* along which the carriage 15 may travel, and a cylindrical core 25 is fastened to the rear plate to extend forwardly through the assembly and concentrically into the hole in the front plate. This core is smaller in diameter than the hole so as to cooperate with the hole in defining the annular gap 19** in the front plate.

Constructed in this manner, the permanent magnet assembly 21 forms a magnetic circuit for the flux produced by the magnets 23, from the poles at the rear edges of the magnets, through the rear plate 22 to the core 25, through the latter to the front end thereof, across the gap 19 to the front plate 20, and through the front plate to the opposite poles at the front edges of the magnets. It will be seen in FIGS. 2 and 4 that the longitudinal edges 23*a* of the magnets are spaced apart across the top and bottom of the assembly on opposite sides of slots of substantial width, and that the magnets thus are isolated from each other by these slots.

The support 14 is a post which extends upwardly from the track 17 in front of the front plate 20 of the magnet assembly 21, and the coil 18 is attached to lugs 27 on the rear side of the post in coaxial relation with the air gap 19 in the magnet assembly to extend through the gap and into the assembly, parallel to the track. In the illustrative embodiment, the coil comprises a hollow cylindrical coil form 28 with two helical layers of wire wound thereon in the usual manner, the coil form having a supporting ring 29 that is attached to the supporting post 14 by screws 30 threaded into the supporting ring through the lugs 27. Preferably, an annular flange 31 is formed on the rear side of the front plate 20 around the hole therein to increase the axial length of the gap 19 and distribute the magnetic flux over a sufficient area of the coil for optimum interaction with the field generated by the coil when the latter is energized. In addition, a tubular coil 32 of a velocity transducer of well-known design is seated in a central bore 33 (FIG. 1) extending through the core 25, and a magnetic rod 34 is telescoped through this coil and secured to the closed front end 29 of the coil form for movement with the coil to produce a velocity signal during movement of the coil in a manner that is well known to those skilled in the art.

With this basic arrangement, the permanent magnets 23 produce a magnetic field that spans the annular air gap 19 and passes through the portion of the coil 18 within the gap, so that the application of externally controlled electrical signals to the coil produces forces in a well-known manner tending to drive the coil longitudinally of the magnet assembly 21 either to the left or to the right in FIG. 1. These forces are applied to the supporting post 14 through the right end 29 of the coil form 28 to shift the carriage 15 back and forth along its track 17, thereby correspondingly moving the recording heads 11, 12 across the memory discs to bring a selected head into alignment with a selected magnetic track on its associated disc.

As previously mentioned, the positioning of each head 11, 12 relative to its disc must be precise because an error of a few thousandths of an inch can result in misalignment of the head for reading of the desired track. Moreover, the construction of the carriage 15 and the coil 18 is such that the motive forces are applied through the coil at a distance from the track, thus tending to deform the coil, to tilt the carriage relative to the track, and to change the attitude of the carriage and the longitudinal positions of the heads relative to the track, and sometimes tending to cause binding of the carriage on the track.

In accordance with the present invention, the carriage 15 is constructed and supported in a novel manner so as to provide a firm base of support for more effectively resisting deflection of the carriage from its proper position, thereby materially improving the performance and accuracy in service use. To these ends, the carriage includes not only the upright supporting post 14 but also a horizontal undercarriage 35 which extends rearwardly under the coil along the track and through a slot 37 (FIGS. 2 and 4) in the front plate 20 of the magnet assembly 21, and is secured to the rear end portion of the coil to reinforce the latter against deformation. This undercarriage has roller bearings 38 and 39 adjacent its opposite ends which are spaced apart on opposite sides of the center of gravity of the assembly, and includes means for holding the end bearings firmly in engagement with the track. Thus, the weight of the assembly is applied to the bearings and the track without any tendency to tilt the assembly, and the broader base is better able to sustain the driving forces without tilting or binding.

In the present instance, the carriage 15 is an L-shaped bar having an upright leg forming the supporting post 14 and a horizontal leg forming the undercarriage 35. The slot 37 is centrally located in the front plate 20, extends upwardly to the gap 19 to receive the undercarriage with a clearance fit, and has lateral extensions 40 at its lower end providing clearance for passage of the front roller bearings 38 of the undercarriage through the plate into the magnet assembly.

Figure 3:
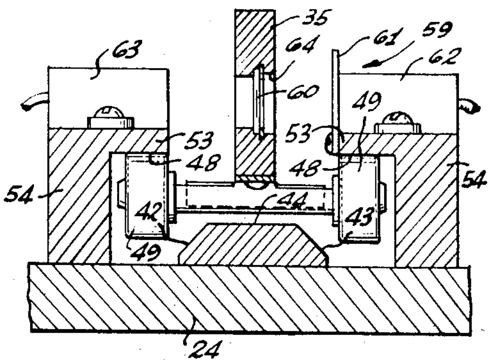
FIG. 3 is an enlarged fragmentary cross section taken substantially along the line 3–3 of FIG. 1 with the carriage extended.

As shown most clearly in FIGS. 2—4, the track 17 herein is an elongated bar that is fastened to the base by a plurality of screws 41 and has two oppositely inclined side surfaces 42 and 43 (see FIG. 3) forming ways upon which the roller bearings ride, the right side surface being inclined downwardly to the right- and the left-side surface being inclined downwardly to the left. The top surface 44 of the bar preferably is flat and horizontal.

Each roller bearing 38, 39 is shown as mounted on a bearing block 45 (see FIG. 4) that is fastened to the underside of the undercarriage with a pair of inclined stub axles fast in opposite sides of the block and parallel to the inclined ways on the track, two rollers 38, 39 being journaled on the axles to ride flat against the inclined ways. The front bearings preferably are positioned immediately beneath the supporting post 14 and the rear bearings are adjacent the rear end of the undercarriage beneath the rear end of the coil.

It will be evident that these inclined bearings 38 and 39 not only provide vertical support for the carriage 15 but also resist lateral movement in either direction when the bearings are in firm engagement with the inclined ways 43 and 44. To maintain such firm engagement, a third bearing assembly 47 is mounted on the undercarriage 35 approximately midway between the main bearings, and is spring urged upwardly against overlying ways 48 on the base 24. Herein, this third bearing assembly comprises a pair of holddown rollers 49 journaled on the opposite ends of a horizontal axle 50 that is carried on a flat spring 51 (see FIG. 1) bolted at 52 to the underside of the undercarriage, the spring being stressed to urge the axle yieldably upwardly. The overlying ways 48 are flat surfaces on the undersides of overhanging shoulders 53 of elongated rails 54 of inverted, L-shaped cross section which are bolted to the base 27 on both sides of the track bar 17, these rails extending into the magnet assembly 21 far enough to engage the holddown rollers throughout the range of travel thereof during normal operation of the actuator, thereby to coact with the holddown rollers in holding the main bearings against the track bar.

To brace the upper end portion of the supporting post 14 against deflection, a guide bar 55 is fastened to the top of the post and projects forwardly through two laterally spaced rollers 57 which are journaled for rotation about vertical axes on a suitably rigid support 58, herein an inverted U-shaped member upstanding from the base 27 and straddling the head-supporting arms 13 as shown in FIG. 1. Preferably, both the guide rollers 57 and the track bar 17 are laterally adjustable for adjustment of the alignment of the coil 18 with the air gap 19.

During movement of the heads 11 and 12, the changing position of the carriage 15 is sensed and signalled by a position-determining device indicated generally at 59 in FIGS. 3 and 4 and herein comprising a moire-optical system including an elongated transparent element 60 movable with the carriage, a second transparent element 61 stationarily mounted alongside the path of the first element, a light source 62 on one side of the carriage for projecting a beam of light through the elements as they move relative to each other, and a photocell 63 on the other side for receiving the beam projected through the elements. In such a system, the transparent elements propogate a series of typically horizontal lines with which the position of the carriage is determined electronically.

As shown in FIGS. 1, 2 and 4, the element 60 is set in an elongated aperture 64 in the undercarriage 35 and the light source 62 is mounted on top of one of the rails 54 to project the beam through the element 61 toward the photocell 63, which is mounted on top of the other rail 54. The present invention thus makes it possible to mount the movable transparent element 60 rigidly, and in a precisely located position, on the undercarriage for accurate position determination.

From the foregoing, it will be evident that the present invention provides a materially improved construction and mounting for the disc-reading assembly of an actuator in the environment described, and particularly for an actuator of the moving-coil type, and has the important advantages of providing a broader base of support for the carriage of the assembly, reinforcing the coil against deformation, and positively maintaining the bearings of the carriage in free-rolling engagement with the track while increasing the resistance of the assembly to both tilting and lateral deflection. It also will be seen that, while a particular embodiment and a specific use have been illustrated and described, various modifications and other uses are within the spirit and scope of the invention.

I claim:

1. A moving-coil actuator having, in combination:
a base having an elongated horizontal track thereon;
an L-shaped carriage having an upright supporting post and a horizontal undercarriage extending along and overlying said track;
first and second bearing assemblies mounted on said undercarriage adjacent the opposite ends thereof and spaced on opposite sides of the center of gravity of the carriage and the elements thereon;
a third bearing assembly mounted on said undercarriage between said first and second assemblies, said third assembly being spring urged upwardly;
ways on said base extending along said track above said third bearing assembly and cooperating therewith to hold said first and second assemblies in firm engagement with said track;
an elongated electrical coil spaced above said undercarriage and secured at one end to said post and at the other end to the end portion of said undercarriage remote from said post;
a magnet assembly mounted on said base and having an annular air gap in which said coil extends, said magnet assembly also having a slot beneath said air gap receiving said undercarriage with a clearance fit; and
a plurality of head-supporting arms secured to said post and projecting away therefrom a direction opposite to said undercarriage.

2. A moving-coil actuator as defined in claim 1 in which said track has oppositely inclined side surfaces forming inclined ways for said first and second bearing assemblies, the latter including rollers that are inclined to ride on said inclined ways to resist lateral deflection of said carriage.

3. A moving-coil actuator as defined in claim 1 further including a guide bar secured to the top of said post and projecting in the same direction as said arms; and
guide means preventing lateral deflection of said guide bar during movement of said carriage along said track.

4. A moving-coil actuator as defined in claim 1 further including a first elongated position-determining element rigidly mounted on said undercarriage for movement therewith, and a second position-determining element mounted on said base alongside the path of movement of said first element.

5. A moving-coil actuator comprising:
a base having an elongated track thereon;
a magnet assembly on said base overlying a portion of said track and having an annular air gap in one of its ends, said magnet assembly also having a slot in said one end extending into said slot from the side of the assembly adjacent said track;
an elongated electrical coil extending into said magnet assembly through said gap, parallel to said track;
a carriage connected to said coil and having an elongated undercarriage extending along said track and into said magnet assembly through said slot; and
means on said undercarriage supporting said carriage for back and forth movement along said track.

6. A moving-coil actuator as defined in claim 5 wherein said supporting means include first and second bearing assemblies adjacent the opposite ends of said undercarriage and spaced on opposite sides of the center of gravity of the carriage.

7. A moving-coil actuator as defined in claim 6 further including yieldable means between said bearing assemblies for holding the latter resiliently in engagement with said track.

8. A moving-coil actuator as defined in claim 7 wherein said yieldable means is a third bearing assembly on said undercarriage yieldably urged away from said track, and ways on said base overlying said third bearing assembly to cooperate therewith in urging said undercarriage toward said track.

9. A moving-coil actuator as defined in claim 6 wherein said track is formed with oppositely inclined longitudinal ways, and each of said bearing assemblies has two inclined rollers riding on said inclined ways.

10. A moving-coil actuator as defined in claim 5 wherein said carriage is an L-shaped bar forming an upright post to which said coil is connected, and a horizontal portion forming said undercarriage and connected to the end of said coil remote from said post.

11. A moving-coil actuator as defined in claim 10 in which said supporting means include two bearing assemblies spaced apart and mounted on said undercarriage adjacent the opposite ends thereof, and further including means between said bearing assemblies yieldably holding the latter against said track.

12. A moving-coil actuator as defined in claim 10 further including an elongated guide bar projecting outwardly from said post, parallel to said track, in the direction opposite from said undercarriage, and means on said base guiding said bar against lateral deflection during movement of said carriage along said track.

13. A reciprocating actuator having, in combination:
a base with an elongated horizontal track thereon;
a carriage having an upright support and an elongated horizontal undercarriage connected to the lower end of said support and extending along said track;
a driving member connected to said support above said undercarriage and acting on the support to move said carriage back and forth along said track; and
main bearings on said undercarriage adjacent the opposite ends thereof engaging said track to support said carriage for movement thereon.

14. A reciprocating actuator as defined in claim 13 further including holddown bearings yieldably mounted on said undercarriage between said opposite ends and resiliently urged upwardly, and ways on said base extending along said track above said holddown bearings to coact therewith in maintaining said main bearings firmly against said track.

15. A reciprocating actuator as defined in claim 13 in which said driving member is an electrical coil, and further including a magnet assembly having an annular air gap in one side receiving said coil, and a slot in said one side extending from adjacent said track to said gap, said undercarriage extending into said magnet assembly through said slot.